No. 881,560. PATENTED MAR. 10, 1908.
F. D. DUTTON.
CORN RACK.
APPLICATION FILED MAY 13, 1907.
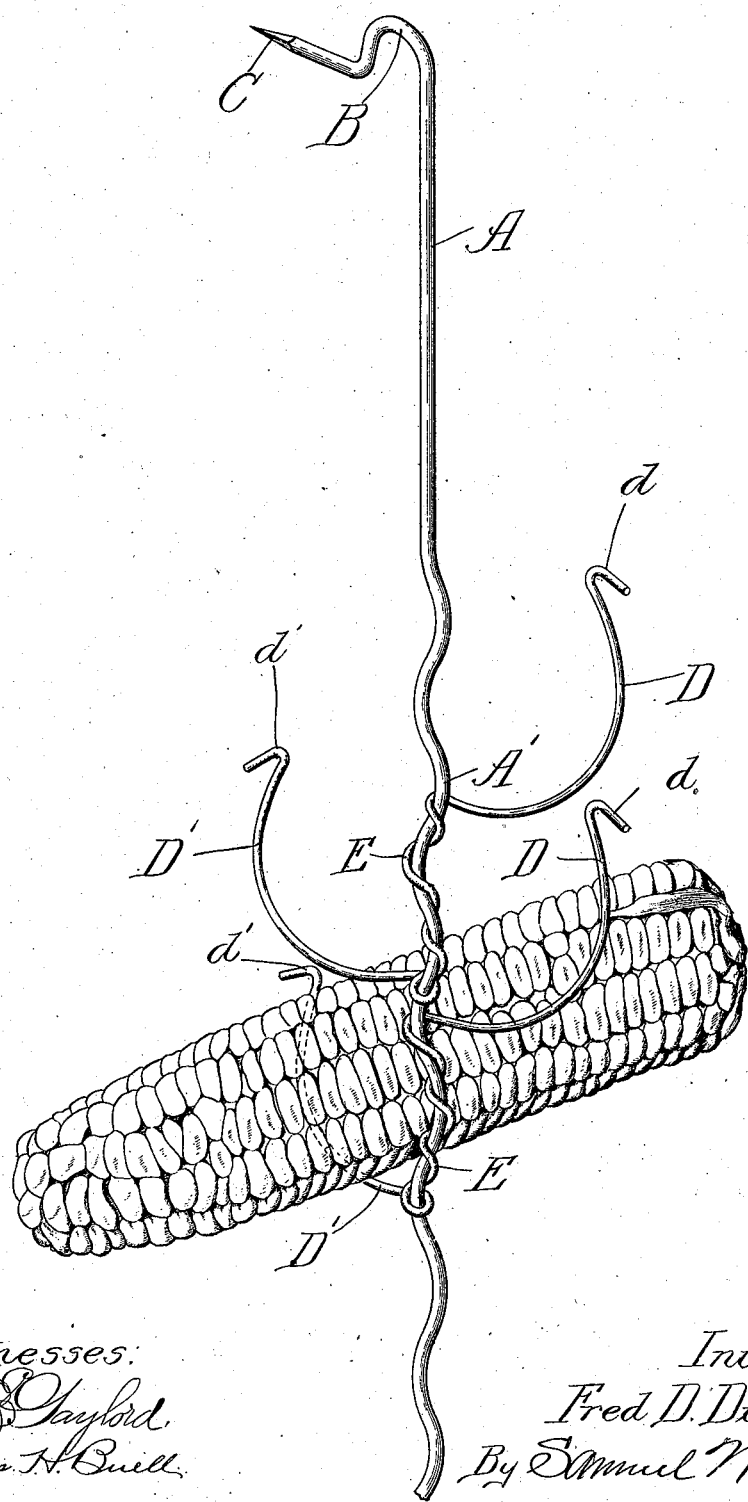
Witnesses:
Inventor:
Fred D. Dutton.
By Samuel N. Pond,
Atty.

UNITED STATES PATENT OFFICE.

FRED D. DUTTON, OF MOUNT PLEASANT, IOWA.

CORN-RACK.

No. 881,560.　　Specification of Letters Patent.　　Patented March 10, 1908.

Application filed May 13, 1907. Serial No. 373,304.

*To all whom it may concern:*

Be it known that I, FRED D. DUTTON, a citizen of the United States, residing at Mount Pleasant, in the county of Henry and State of Iowa, have invented certain new and useful Improvements in Corn-Racks, of which the following is a specification.

This invention relates to a new and improved device in the nature of a corn rack or hanger for supporting seed corn in a manner favorable for thorough drying and curing.

As is well known, corn raisers store away in the fall of the year a certain proportion of their crop as seed for the next year's crop; and this seed corn, being still green when put away, is liable to mold and heat, thus destroying the germ, if not thoroughly aired and dried out. It is also very liable to partial destruction from the inroads of rats and mice and similar vermin.

It is the object and purpose of my invention to provide a simple and inexpensive device for supporting and storing seed corn in a manner most favorable to its thorough drying and curing and likewise in a manner such as to prevent access thereto of destructive vermin.

To this end my invention consists of a corn rack or hanger having the novel peculiarities of structure and mode of use substantially as hereinafter described and pointed out in the claims.

The device of my invention is preferably, though not necessarily, constructed wholly of wire; and such a form is shown in the accompanying drawing, which is a perspective elevation of the device.

Referring to the drawing for a more detailed description of the device, A designates the main stem of the hanger, herein shown as an upright or vertically disposed strip of comparatively heavy wire adapted to be suspended from a beam or rafter of a barn or store-house, for which purpose its upper end may be bent to provide a hook B, with a laterally projecting pointed end C by which it may be either hung over a nail or hook, or driven into the beam or rafter. This stem member may be of any desired or convenient length; and from a point a few inches below its upper end it is preferably crimped, as shown at A', to support a series of alternately arranged and oppositely extending arms herein shown as spring wire branches D and D', in and by which latter the ears of corn are embraced and held in the manner clearly indicated in the drawing. The branch wires D and D' are suitably curved to the surface contour of the average sized ear; and for convenience in inserting the ears in the device the free ends of the branches are rounded by being bent backwardly on themselves, as shown at $d$ and $d'$. The branch wires are conveniently attached to the main stem or support by simply winding or twisting them around the latter, as shown at E; to facilitate which each adjacent pair of branches D and D' may be made from a single length of wire having its intermediate portion twisted around the main stem, as shown. The crimping of the main stem prevents the branches from slipping down under the weight of the corn. The several branches on each side are preferably located or spaced at such intervals that, when loaded, they will rest upon and in a measure brace each other.

From the foregoing it will be seen that the ears of corn are supported out of substantial contact with each other, and are contacted by the rack to but a very slight extent. This affords a very full and free circulation of air around the corn, insuring a thorough drying and curing of the latter. Furthermore, the main vertical support being of metal and with a smooth surface, the device successfully resists the efforts of mice and other destructive vermin to get at the corn. The elastic ear-supporting branches are preferably made of steel wire to secure the necessary strength with a minimum size, since it is desirable to present as small a contacting surface to the corn as possible.

I claim:

1. A corn-rack comprising a main upright stem-member and a plurality of pairs of curved elastic arms extending laterally from said stem-member and adapted to embrace ears of corn, the arms of each pair extending on opposite sides of said stem-member and formed from a single length of wire having its intermediate portion twisted around said stem-member, substantially as described.

2. A corn rack, comprising a crimped stem-wire and a plurality of curved elastic branch wires adapted to embrace ears of corn, said branch wires being secured to said stem-wire by being wound around the latter, substantially as described.

3. A corn hanger, comprising a depending crimped stem-wire having means for suspending the same at its upper end, and a plurality of curved elastic branch wires extending alternately from opposite sides thereof and adapted to embrace ears of corn, said branch wires being secured to said stem-wire by being wound around the latter, substantially as described.

FRED D. DUTTON.

Witnesses:
F. S. FINLEY.
J. N. DUTTON.